US006462524B1

(12) United States Patent
Maniktala

(10) Patent No.: US 6,462,524 B1
(45) Date of Patent: Oct. 8, 2002

(54) FLOATING BUCK REGULATOR TOPOLOGY

(75) Inventor: Sanjaya Maniktala, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/978,453

(22) Filed: Oct. 16, 2001

(51) Int. Cl.[7] .............................................. G05F 1/40
(52) U.S. Cl. ...................... 323/282; 323/284; 323/290
(58) Field of Search ................................. 323/266, 223, 323/247, 259, 265, 282, 284, 290

(56) References Cited

U.S. PATENT DOCUMENTS 5,552,695 A * 9/1996 Schwartz .................... 323/271
5,977,753 A * 11/1999 Edwards et al. ............. 323/222
6,008,999 A * 12/1999 Marrero ...................... 323/222
6,347,045 B1 * 2/2002 Poon et al. .................... 363/39

* cited by examiner

*Primary Examiner*—Shawn Riley
(74) *Attorney, Agent, or Firm*—Brett A. Hertzberg; Thomas S. Wong; Merchant & Gould P.C.

(57) ABSTRACT

Apparatus and method that provide for a Buck regulator with reduced open-switch voltage requirements. The buck regulator includes a transformer with a primary coil that is charged by an input voltage when the semiconductor switching circuit is in a closed circuit condition. A secondary coil of the transformer is arranged to provide an auxiliary regulated potential that may be coupled to an auxiliary load. The auxiliary regulated potential is further arranged to operate as a virtual ground node with respect to the semiconductor switching circuit such that the open circuit voltage requirements for the semiconductor switching circuit are reduced. The open circuit voltage across the semiconductor switching circuit is approximately equal to the input voltage minus the voltage of the virtual ground node.

21 Claims, 2 Drawing Sheets

FLOATING BUCK REGULATOR TOPOLOGY

FIELD OF THE INVENTION

The present invention relates to Buck regulators. In particular, the present invention relates to a method and apparatus that provides for a Buck regulator with a reduced open-switch voltage requirement.

BACKGROUND OF THE INVENTION

A buck regulator is a type of step-down switching regulator. A buck regulator provides a regulated DC output voltage to a load. Switching of the regulator is often accomplished with a semiconductor switch. The buck regulator employs an inductor that is arranged to charge when the semiconductor switch is closed. The current through the inductor increases linearly while the semiconductor switch is closed. A capacitor is connected across the load to reduce ripple in the output voltage. A freewheeling diode is connected to the inductor so that current continues to flow through the inductor when the semiconductor switch is opened. The current through the inductor decreases while the semiconductor switch is open. The load, the freewheeling diode, and the capacitor are all connected to a common ground potential.

SUMMARY OF THE INVENTION

The present invention is directed to a Buck regulator that includes a semiconductor switching circuit with reduced voltage requirements. The buck regulator includes a transformer with a primary coil that is charged by an input voltage when the semiconductor switching circuit is in a closed circuit condition. A secondary coil of the transformer is arranged to provide an auxiliary regulated potential that may be coupled to an auxiliary load. The auxiliary regulated potential is further arranged to operate as a virtual ground node with respect to the semiconductor switching circuit such that the open circuit voltage requirements for the semiconductor switching circuit are reduced. The open circuit voltage across the semiconductor switching circuit corresponds to the difference between the input voltage and the voltage associated with the virtual ground node.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on". The term "ground" means an earth ground, a power supply potential, a regulated potential, or any common node that is arranged to operate as a circuit ground.

Figure 1:
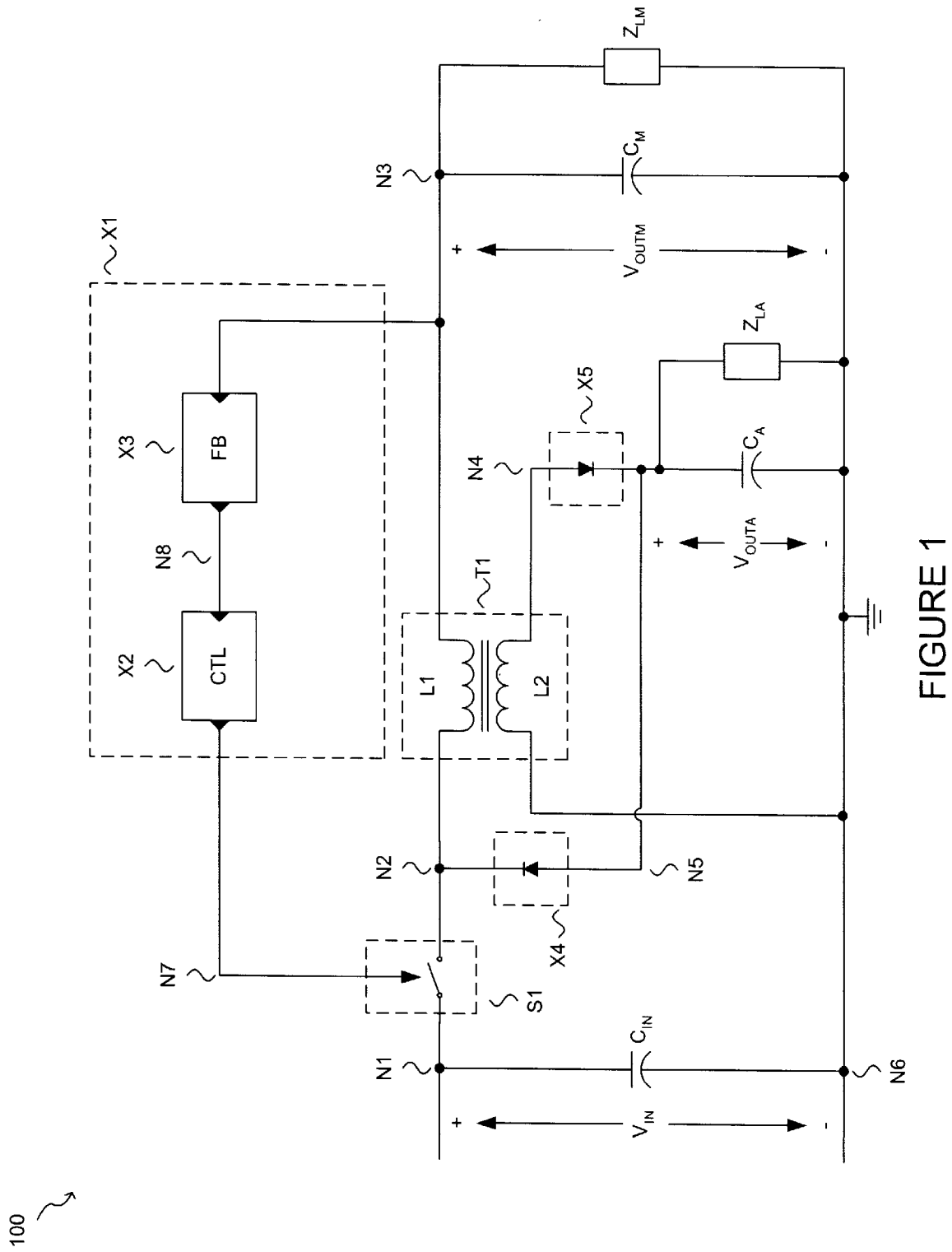
FIG. 1 is a schematic diagram illustrating an exemplary buck regulator.

FIG. 1 is a schematic diagram that illustrates a floating buck regulator (100) that is in accordance with one embodiment of the present invention. Floating buck regulator 100 includes a switch control circuit (X1), two rectifier circuits (X4 and X5), three capacitor circuits (CIN, CA, and CM), a switching circuit (S1), a transformer (T1), a main load (ZLM), and an auxiliary load (ZLA). Switch control circuit X1 includes a controller circuit (X2) and a feedback circuit (X3). Transformer T1 includes a primary coil (inductor, L1) and a secondary coil (inductor, L2).

Capacitor CIN is coupled between node N1 and node N6. Switching circuit S1 is coupled between node N2 and node N1, and has a switching control node that is coupled to node N7. Rectifier circuit X4 is coupled between node N2 and node N5. Primary coil L1 is coupled between node N2 and node N3. Secondary coil L2 is coupled between node N6 and node N4. Rectifier circuit X5 is coupled between node N4 and node N5. Capacitor CA is coupled between node N5 and node N6. Capacitor CM is coupled between node N3 and node N6. Main load ZLM is coupled between node N3 and node N6. Auxiliary load ZLA is coupled between node N5 and node N6. Controller circuit X2 has an output that is coupled to node N7 and an input that is coupled to node N8. Feedback circuit X3 has an input that is coupled to node N3 and an output that is coupled to node N8.

In operation, input voltage VIN is applied across nodes N1 and N6, and node N6 is configured to operate as a circuit ground potential (GND). When Switch S1 is selected to operate in a closed position, the input voltage (VIN) provides energy to the transformer (T1). Transformer T1 is arranged to store energy when switch S1 is closed, and produces a main output voltage (VOUTM) and an auxiliary output voltage (VOUTA) in response to input voltage VIN. Main output voltage VOUTM appears across main load ZLM. Capacitor CM is arranged to operate as a temporary charge store that reduces ripple in main output voltage VOUTM. Similarly, auxiliary output voltage VOUTA appears across auxiliary load ZLA, and capacitor CA is arranged to operate as a temporary charge store that reduces ripple in auxiliary output voltage VOUTA.

The voltages across loads ZLM and ZLA are determined by the timing of for opening and closing switching circuit S1. Control circuit X1 is arranged to provide timing control to switching circuit S1 such that a desired main output voltage (VOUTM) is achieved. In one embodiment, the control is accomplished by comparing the main output voltage (VOUTM) to a reference voltage (VREF, not shown) in order to determine when switching circuit S1 should be opened and closed. For example, the switch is closed when main output voltage VOUTM is lower than reference voltage VREF such that the transformer receives more energy from VIN and main output voltage VOUTM increases.

Voltages VOUTM and VOUTA are produced by transformer T1. Main output voltage VOUTM corresponds to the voltage drop between nodes N3 and N6. Auxiliary output voltage VOUTA corresponds to the voltage drop between nodes N5 and nodes N6. Node N6 corresponds to a circuit ground (GND, i.e. 0V).

The potential at node N3 is produced by primary coil L1 in response to the input signal (VIN, when switch S1 is closed). Primary coil L1 charges when switching circuit S1 is in a closed position. Current flows through primary coil L1, is delivered to the main load (ZLM) and returns to the circuit ground (GND). The current flow through primary coil L1 increases linearly while switching circuit S1 is closed. The current flowing through primary coil L1 ceases to increase when switching circuit S1 is opened. However, rectifier X4 operates as an alternate current path such that the current flow through primary coil L1 is not interrupted. The current flowing through primary coil L1 decreases linearly as current flows through rectifier circuit X4 when switching circuit S1 is open. The main output voltage (VOUTM) that is delivered to main load ZLM is determined by input voltage VIN, and the on (closed-circuit) and off (open-circuit) times associated with switching circuit S1.

The potential at node N5 is produced by secondary coil L2 in response to input voltage VIN. Secondary coil L2 charges in response to current flowing in primary coil L1 as a result of transformer action. Thus, the current flow in secondary coil L1 increases when the current flowing in primary coil L1 is increasing (i.e., switching circuit S1 is closed). Similarly, the current flowing through secondary coil L2 decreases as a result of transformer action. Rectifier X5 rectifies the current flow through secondary coil L2 such that secondary coil L2 only conducts in a single direction. The auxiliary output voltage (VOUTA) that is delivered to auxiliary load ZLA is determined by input voltage VIN, the on (closed-circuit) and off (open-circuit) times associated with switching circuit S1, and the turns ratio (r) associated with the transformer T1.

Switch S1 can be any type of semiconductor switch. In one embodiment, switch S1 is a transistor such as a field effect transistor (i.e., MOSFET, JFET, etc.). Controller circuit X2 and feedback circuit X3 are shown as separate circuits. However, controller circuit X2 and feedback circuit X3 may be combined into a single circuit such as switch control circuit (X1).

Figure 2:
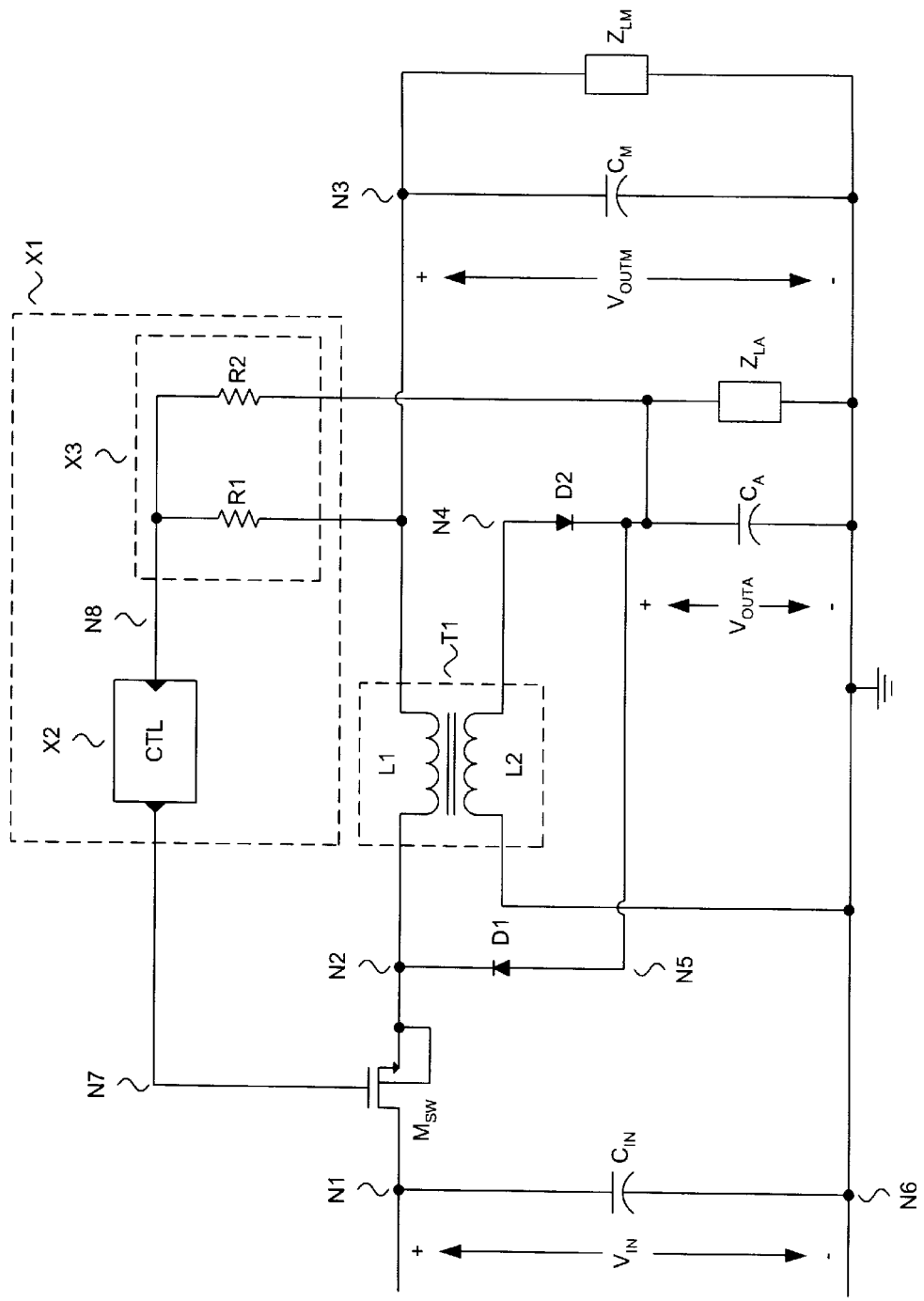
FIG. 2 is a schematic diagram illustrating another exemplary buck regulator that is in accordance with the present invention.

FIG. 2 is a schematic diagram that illustrates a floating buck regulator (200) that is in accordance with another embodiment of the present invention. Floating buck regulator 200 includes a switch control circuit (X1), two diodes (D1 and D4), three capacitor circuits (CIN, CA, and CM), a switching transistor (MSW), a transformer (T1), a main load (ZLM), and an auxiliary load (ZLA). Transformer T1 includes a primary coil (L1) and a secondary coil (L2). Switch control circuit X1 includes a controller circuit (X2) and a feedback circuit (X3). Feedback circuit X3 includes two resistors (R1 and R2).

Capacitor CIN is coupled between node N1 and node N6. Switching transistor MSW has a drain that is coupled to node N1, a source and bulk that are coupled to node N2, and a gate that is coupled to node N7. Diode D1 is coupled between node N2 and node N5. Primary coil L1 is coupled between node N2 and node N3. Secondary coil L2 is coupled between node N6 and node N4. Diode D2 is coupled between node N4 and node N5. Capacitor CA is coupled between node N5 and node N6. Capacitor CM is coupled between node N3 and node N6. Main load ZLM is coupled between node N3 and node N6. Auxiliary load ZLA is coupled between node N5 and node N6. Controller circuit X2 has an output that is coupled to node N7 and an input that is coupled to node N8. Resistor R1 is coupled between node N8 and node N4. Resistor R2 is coupled between node N8 and node N6.

In operation, input voltage VIN is applied across nodes N1 and N6, and node N6 is configured to operate as a circuit ground potential (GND). Switching transistor MSW is activated by applying a bias voltage to its gate such that it operates as a closed circuit switch when activated, and an open-circuit switch when deactivated. Transformer T1 is arranged to store energy when switching transistor MSW is active, and produces a main output voltage (VOUTM) and an auxiliary output voltage (VOUTA) in response to input voltage VIN. Main output voltage VOUTM appears across main load ZLM. Capacitor CM is arranged to operate as a temporary charge store that reduces ripple in main output voltage VOUTM. Similarly, auxiliary output voltage VOUTA appears across auxiliary load ZLA, and capacitor CA is arranged to operate as a temporary charge store that reduces ripple in auxiliary output voltage VOUTA.

The voltages across loads ZLM and ZLA are determined by the timing associated with selectively activating and deactivating switching transistor MSW. Control circuit X1 is arranged to provide timing control to switching transistor MSW such that a desired main output voltage (VOUTM) is achieved. A feedback voltage (VFB) is provided to the controller at node N8. Controller circuit X2 compares feedback voltage VFB to a reference voltage to determine when to actuate switching transistor MSW. Feedback voltage VFB is determined by the ratio of the values associated with resistors R1 and R2, and main output voltage VOUTM. Resistors R1 and R2 are arranged to operate as a voltage divider between nodes N3 and N5. Resistor R2 may alternatively be connected to node N6 instead of node N5.

Voltages VOUTM and VOUTA are produced by transformer T1. Main output voltage VOUTM corresponds to the voltage drop between nodes N3 and N6. Auxiliary output voltage VOUTA corresponds to the voltage drop between nodes N5 and nodes N6. Node N6 corresponds to a circuit ground (GND, i.e. 0V).

The potential at node N3 is produced by primary coil L1 in response to the input signal (VIN, when switching transistor MSW is active). Primary coil L1 charges when switching circuit S1 is in a closed position. Current flows through primary coil L1, is delivered to the main load (ZLM) and returns to the circuit ground (GND). The current flow through primary coil L1 increases linearly while switching transistor MSW is active. The current flowing through primary coil L1 ceases to increase when switching transistor MSW is deactivated. However, diode D1 operates as freewheeling diode (aka catch diode) that provides an alternate current path such that the current flow through primary coil L1 is not interrupted. The current flowing through primary coil L1 decreases as current flows through diode D1 when switching transistor MSW is inactive. The main output voltage (VOUTM) that is delivered to main load ZLM is determined by input voltage VIN, and the active (closed-circuit) and inactive (open-circuit) times associated with switching transistor MSW.

The potential at node N5 is produced by secondary coil L2 in response to input voltage VIN. Secondary coil L2 charges in response to current flowing in primary coil L1 as a result of transformer action. Thus, the current flow in secondary coil L1 increases when the current flowing in primary coil L1 is increasing (i.e., switching transistor MSW is active). Similarly, the current flowing through secondary coil L2 decreases as a result of transformer action. Diode D2 rectifies the current flow through secondary coil L2 such that secondary coil L2 only conducts in a single direction. The auxiliary output voltage (VOUTA) that is delivered to auxiliary load ZLA is determined by input voltage VIN, the active (closed-circuit) and inactive (open-circuit) times associated with switching transistor MSW, and the turns ratio (r) associated with the transformer T1.

In the present invention, an auxiliary output voltage (VOUTA) is utilized as an auxiliary supply rail that operates as a virtual ground. The auxiliary supply rail (or virtual ground) is created from the flyback energy in the transformer. This auxiliary supply rail is used to reduce the operating voltage across the switching element (S1 in FIG. 1, and MSW in FIG. 2) when the switching element is in the open-circuit position.

The main and auxiliary output voltages (VOUTM and VOUTA) are determined by the on (TON) and off (TOFF) times associated with the switching element, the input voltage (VIN), and the turns ratio (r) associated with the transformer. The turns ratio (r) corresponds to the number of turn in the primary coil (L1) divided by the number of turns in the secondary coil (L2). Ignoring diode voltage drops, and the on resistance associated with the switching element (i.e., RDSON for transistor MSW), and assuming the turns ratio (r) is 1, the voltages can be solved as follows below.

While the switching element is closed, the voltage across the primary coil (L1) is VIN-VOUTM, disregarding the voltage drop across switching transistor MSW. When the switching element is opened, the voltage across the primary is in the opposite direction of VOUTM-VOUTA, disregarding the voltage drop across the catch diode (D1). However, the volts per turn must be maintained across the transformer when the switching element is open. Thus, voltage across the secondary winding (L2) must equal the voltage across primary winding (L1), yielding VOUTA=VOUTM-VOUTA. Therefore, VOUTA=VOUTM/2 when the turns ratio (r) is unity (1).

The duty cycle (δ) can be determined by applying the volts-seconds rule as follows below:

(VIN−VOUTM)·TON=(VOUTM−VOUTA)·TOFF

Since:

$$VOUTA = \frac{VOUTM}{2}$$

the volts-seconds equation is reduced to:

$$(VIN - VOUTM) \cdot TON = \frac{(VOUTM \cdot TOFF)}{2}, \text{ and}$$

$$\frac{TON}{TOFF} = \frac{VOUTM}{2 \cdot (VIN - VOUTM)}$$

The duty cycle (δ) is given by:

$$\delta = \frac{TON}{Period} = \frac{TON}{TON + TOFF} = \frac{1}{1 + \frac{TOFF}{TON}}$$

The duty cycle (δ) is determined as:

$$\delta = \frac{VOUTM}{(2 \cdot VIN) - VOUTM}$$

When the turns ratio (r) is other than unity, $$VOUTA = \frac{VOUTM}{1 + r}$$

For an arbitrary turns ratio (r), the duty cycle (δ) is determined as:

$$\delta = \frac{VOUTM \cdot R}{((l + r) \cdot VIN) - VOUTM}$$

The floating buck regulators (100, 200) illustrated above provide a number of advantages over a conventional Buck regulator. The floating buck regulators have reduced open-switch voltage requirements. A conventional buck regulator has an open switch voltage that is approximately equal to input voltage (ignoring the switch resistance). The floating buck regulators have an open-switch voltage that is approximately equal to the input voltage (VIN) minus the voltage of the virtual ground node (node N5). Since the voltage at N5 is above the circuit ground potential, the open-switch voltage requirements are reduced.

Semiconductor switching devices have an open-circuit voltage limit that is largely dependent on the breakdown voltage of the switching device (i.e., 40V–60V). The present invention provides for a reduced open-switch voltage requirement. Thus the de-rating margin for the switching device is increased. In one example, a switching device with a lower open-switch voltage is used for a desired main output voltage (VOUTM). Since the virtual ground node in the floating buck regulator reduces the open-switch voltage requirements, a less-expensive switching device with a lower open-switch voltage limit may be used.

In another example, the same switching device that would have been used in a conventional buck regulator is used in the floating buck regulator, with increased de-rating margin (i.e., the margin for the open switch voltage limit is increased). Improved reliability is obtained by increasing the de-rating margin.

In yet another example, the input voltage is increased using the same switching device as a conventional buck regulator. Although, the switching device in the floating buck regulator has the same de-rating margin as the conventional buck regulator, the floating buck regulator can safely operate over a wider input voltage range without damaging the switching device.

The floating buck regulator also provides for an auxiliary power supply rail (virtual ground) that may be used to drive an auxiliary load. The virtual ground node (node N6) is a regulated voltage (approximately within 5%). The auxiliary output voltage (VOUTA) may be used as a power line for circuitry that is isolated from the main output voltage (VOUTM).

Although the preceding description describes various embodiments of the system, the invention is not limited to such embodiments, but rather covers all modifications, alternatives, and equivalents that fall within the spirit and scope of the invention. Since many embodiments of the invention can be made without departing from the spirit and scope of the invention, the invention resides in the claims hereinafter appended

I claim:

1. An apparatus that is arranged to receive an input voltage that is provided between an input terminal and a circuit ground, and provide an output voltage to a load that is coupled to the circuit ground, wherein the circuit ground has an associated circuit ground voltage, the apparatus comprising:

a first coil circuit that is arranged to conduct a first current and provide the output voltage to the load;

a switch control circuit that is arranged to provide a control signal in response to the output voltage;

a switching circuit that is arranged to cooperate with the first coil circuit such that the output voltage is regulated by selective activation of the switching circuit in response to the control signal, wherein the switching circuit has an associated open circuit voltage when the switching circuit is in an open position;

a first rectifier circuit that is arranged to conduct the first current when the switching circuit is in the open position;

a second coil circuit that is coupled to a circuit ground and inductively coupled to the first coil circuit; and a second rectifier circuit that is arranged to conduct a second current that is provided by the second coil circuit, wherein the second coil circuit and the second rectifier circuit are arranged to provide a virtual ground, wherein the virtual ground has an associated virtual ground voltage that is different from the circuit ground voltage, and the open circuit voltage associated with the switching circuit is determined by a difference between at least the input voltage and the virtual ground voltage.

2. The apparatus of claim 1, further comprising a first capacitor circuit that is in coupled in parallel with the load such that the output voltage is filtered.

3. The apparatus of claim 1, wherein the switching circuit includes a semiconductor switch that is selectively activated in response to the control signal.

4. The apparatus of claim 1, wherein the switching circuit includes a MOSFET that is selectively activated in response to the control signal.

5. The apparatus of claim 1, wherein the first rectifier circuit includes a diode.

6. The apparatus of claim 1, wherein the second rectifier circuit includes a diode.

7. The apparatus of claim 1, further comprising a second capacitor circuit that is coupled between the circuit ground and the virtual ground.

8. The apparatus of claim 1, the switch control circuit further comprising a feedback circuit that is arranged to provide a feedback voltage to an input of a controller circuit.

9. The apparatus of claim 8, the feedback circuit further comprising a voltage divider that is arranged to provide the feedback voltage.

10. The apparatus of claim 9, the voltage divider further comprising:
a first resistor that is coupled between the load and an input of the controller circuit; and
a second resistor that is coupled between the input of the controller circuit and one of the circuit ground and the virtual ground.

11. The apparatus of claim 8, wherein the controller circuit is arranged provide the control signal in response to a comparison between the feedback voltage and a reference voltage.

12. The apparatus of claim 1, wherein the switching circuit is a semiconductor switch that is selectively activated by the control signal, the first rectifier circuit is a freewheeling diode that is arranged to provide a conduction path from the virtual ground to the first coil circuit when the semiconductor switch is deactivated such that the open circuit voltage associated with the switching circuit is determined by the input voltage, the virtual ground voltage, and a diode voltage associated with the freewheeling diode.

13. The apparatus of claim 1, further comprising a second capacitor circuit that is in coupled to the virtual ground such that the virtual ground voltage is filtered.

14. The apparatus of claim 13, wherein the first capacitor is coupled in parallel with an auxiliary load that is coupled between the virtual ground and the circuit ground.

15. A method for reducing an open-switch voltage associated with a switch in a switching regulator, wherein the switching regulator produces an output voltage in response to an input voltage, the method comprising:
actuating the switch in response to a control voltage;
providing a control voltage in response to the output voltage;
coupling the input voltage to a primary coil in a transformer when the switch is in a closed position;
isolating the input voltage from the primary coil in the transformer when the switch is in an open position;
producing a virtual ground voltage at a virtual ground node with a secondary coil in the transformer; and
providing a conduction path from the virtual ground node to the switch when the switch is in the open position such that the open-switch voltage of the switch is determined by at least the input voltage and the virtual ground voltage.

16. The method of claim 15, further comprising filtering the output voltage in order to reduce ripple.

17. The method of claim 15, further comprising:
producing a first current with the primary coil, wherein the first current increases linearly when the switch is in the closed position, and the first current decreases linearly when the switch is in the open position; and
producing a second current in response to the first current, wherein the second current increases linearly when the switch is closed, and the second current decreases linearly when the switch is open.

18. The method of claim 17, further comprising providing an alternative current path for the first current when the switch is in the open position.

19. The method of claim 17, further comprising rectifying the second current such that the second current flows through the secondary coil in a single direction.

20. An apparatus for receiving an input voltage and producing an output voltage that is regulated, the apparatus comprising:
a first inductive means that is arranged to store magnetic energy when charged, and also arranged to produce the output voltage;
a means for switching that is arranged to selectively couple the input voltage to the first inductive means;
a second inductive means that is arranged to receive magnetically coupled energy from the first inductive means, and also arranged to produce a virtual ground voltage;
a means for actuating that is arranged to actuate the switch in response to the output voltage such that the output voltage is regulated; and
a means for reducing the open-circuit voltage that is arranged to reduce an open-circuit voltage associated with the means for switching such that the open-circuit voltage is determined by at least the input voltage and the virtual ground voltage.

21. An apparatus that is arranged to receive an input voltage from an input terminal, and provide an output voltage to a load at an output terminal, the apparatus comprising:
a first coil circuit that is coupled between a first node and the output terminal;
a switching circuit that is coupled between tie input terminal and the first node, wherein the switching circuit is arranged to couple the input voltage to the first node when actuated in response to a control signal;

a switch control circuit that is coupled to the output terminal and configured to provide the control signal to the output voltage in response to the output voltage such that the switching circuit, the first coil circuit, and the switch control circuit cooperate with one another to regulate the output voltage;

a first rectifier circuit that is coupled between a second node and the first node;

a second coil circuit that is coupled between the circuit ground and a third node, wherein the first coil circuit is magnetically coupled to the first coil circuit; and a second rectifier circuit that is coupled between the third node and the second node such that the second coil circuit and the second rectifier circuit cooperate with one another to provide a virtual ground at the second node, wherein the first rectifier circuit couples the virtual ground to the first node when the switching circuit is in an open position such that the open circuit voltage of the switching circuit is determined by the input voltage and the voltage associated with the virtual ground, and wherein the second rectifier circuit is arranged to prevent conduction in the second coil circuit when the switching circuit is in the open position.

\* \* \* \* \*